United States Patent
Watfa et al.

(10) Patent No.: US 11,765,676 B2
(45) Date of Patent: Sep. 19, 2023

(54) MANAGING PDU SESSIONS IN A TELECOMMUNICATION SYSTEM

(71) Applicant: Samsung Electronics Co., Ltd., Suwon-si (KR)

(72) Inventors: Mahmoud Watfa, Staines (GB); Mehrdad Shariat, Staines (GB); Andrew Bennett, Staines-upon-Thames (GB)

(73) Assignee: Samsung Electronics Co., Ltd., Suwon-si (KR)

(*) Notice: Subject to any disclaimer, the term of this patent is extended or adjusted under 35 U.S.C. 154(b) by 116 days.

(21) Appl. No.: 17/492,218

(22) Filed: Oct. 1, 2021

(65) Prior Publication Data
US 2022/0110080 A1   Apr. 7, 2022

(30) Foreign Application Priority Data

Oct. 2, 2020   (GB) ........................................ 2015676
Sep. 29, 2021  (GB) ........................................ 2113942

(51) Int. Cl.
*H04W 60/00*   (2009.01)
*H04W 76/20*   (2018.01)

(52) U.S. Cl.
CPC .......... *H04W 60/00* (2013.01); *H04W 76/20* (2018.02)

(58) Field of Classification Search
None
See application file for complete search history.

(56) References Cited

U.S. PATENT DOCUMENTS

| | | |
|---|---|---|
| 2019/0007921 A1 | 1/2019 | Schliwa-Bertling et al. |
| 2019/0149421 A1 | 5/2019 | Jin et al. |
| 2019/0394833 A1 | 12/2019 | Talebi Fard et al. |
| 2020/0245404 A1* | 7/2020 | Suh .................... H04W 48/16 |
| 2021/0297888 A1 | 9/2021 | Suh et al. |
| 2022/0159605 A1* | 5/2022 | Li .......................... H04W 60/00 |
| 2022/0377693 A1* | 11/2022 | Sugawara ............. H04W 60/00 |

FOREIGN PATENT DOCUMENTS

| | | |
|---|---|---|
| WO | 2020/032772 A1 | 2/2020 |
| WO | 2020/155021 A1 | 8/2020 |

OTHER PUBLICATIONS

GB Search Report dated May 31, 2022, issued in GB Application No. GB2113942.3.

(Continued)

*Primary Examiner* — Mazda Sabouri
(74) *Attorney, Agent, or Firm* — Jefferson IP Law, LLP

(57) ABSTRACT

The disclosure relates to a communication method and system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as a smart home, a smart building, a smart city, a smart car, a connected car, health care, digital education, smart retail, security and safety services. Methods and apparatuses for supporting a plurality of PDU sessions are provided.

20 Claims, 9 Drawing Sheets

(56) References Cited

OTHER PUBLICATIONS

3rd Generation Partnership Project; Technical Specification Group Services and System Aspects; Study on system enhancement for Proximity based Services (ProSe) in the 5G System (5GS) (Release 17), 3GPP TS 23.752 V0.5.0, Sep. 2020, Valbonne, France.
3rd Generation Partnership Project; Technical Specification Group Core Network and Terminals; Mobile radio interface signalling layer 3; General aspects, (Release 16), 3GPP TS 24.007 V16.4.0, Sep. 2020, Valbonne, France.
3rd Generation Partnership Project; Technical Specification Group Core Network and Terminals; Non-Access-Stratum (NAS) protocol for 5G System (5GS); Stage 3; (Release 16), 3GPP TS 24.501 V16.6.0, Sep. 2020, Valbonne, France.
Samsung, Uplink data status IE, C1-183360, 3GPP TSG-CT WG1 Meeting #111, May 14, 2018, Osaka, Japan.
Telstra, 5WWC: Support of community WiFi, S2-1810566, SA WG2 Meeting #129, Oct. 9, 2018, Dongguan, P. R. China.
International Search Report dated Jan. 5, 2022, issued in International Application No. PCT/KR2021/013518.

* cited by examiner

FIG. 2

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | No PDU session identity assigned |
| 0 | 0 | 0 | 0 | 0 | 0 | 0 | 1 | PDU session identity value 1 |
| 0 | 0 | 0 | 0 | 0 | 0 | 1 | 0 | PDU session identity value 2 |
| 0 | 0 | 0 | 0 | 0 | 0 | 1 | 1 | PDU session identity value 3 |
| 0 | 0 | 0 | 0 | 0 | 1 | 0 | 0 | PDU session identity value 4 |
| 0 | 0 | 0 | 0 | 0 | 1 | 0 | 1 | PDU session identity value 5 |
| 0 | 0 | 0 | 0 | 0 | 1 | 1 | 0 | PDU session identity value 6 |
| 0 | 0 | 0 | 0 | 0 | 1 | 1 | 1 | PDU session identity value 7 |
| 0 | 0 | 0 | 0 | 1 | 0 | 0 | 0 | PDU session identity value 8 |
| 0 | 0 | 0 | 0 | 1 | 0 | 0 | 1 | PDU session identity value 9 |
| 0 | 0 | 0 | 0 | 1 | 0 | 1 | 0 | PDU session identity value 10 |
| 0 | 0 | 0 | 0 | 1 | 0 | 1 | 1 | PDU session identity value 11 |
| 0 | 0 | 0 | 0 | 1 | 1 | 0 | 0 | PDU session identity value 12 |
| 0 | 0 | 0 | 0 | 1 | 1 | 0 | 1 | PDU session identity value 13 |
| 0 | 0 | 0 | 0 | 1 | 1 | 1 | 0 | PDU session identity value 14 |
| 0 | 0 | 0 | 0 | 1 | 1 | 1 | 1 | PDU session identity value 15 |

PDU session identity value (octet 1, bit 1 to bit 8)

All other values are reserved

FIG. 4

| 8 | 7 | 6 | 5 | 4 | 3 | 2 | 1 | |
|---|---|---|---|---|---|---|---|---|
| colspan="8" | Uplink data status IEI | | | | | | | | octet 1 |
| colspan="8" | Length of uplink data status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 spare | 0 | 0 | 0 | 0 | 0 | 0 | 0 | octet 5*- 34* |

FIG. 5

| 8 | 7 | 6 | 5 | 4 | 3 | 2 | 1 | |
|---|---|---|---|---|---|---|---|---|
| Allowed PDU session status IEI | | | | | | | | octet 1 |
| Length of Allowed PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 spare | 0 | 0 | 0 | 0 | 0 | 0 | 0 | octet 5*– 34* |

FIG. 6

| 8 | 7 | 6 | 5 | 4 | 3 | 2 | 1 | |
|---|---|---|---|---|---|---|---|---|
| PDU session status IEI | | | | | | | | octet 1 |
| Length of PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 spare | 0 | 0 | 0 | 0 | 0 | 0 | 0 | octet 5*- 34* |

MANAGING PDU SESSIONS IN A TELECOMMUNICATION SYSTEM

CROSS-REFERENCE TO RELATED APPLICATION(S)

This application is based on and claims priority under 35 U.S.C. § 119(a) of a Great Britain patent application number 2015676.6, filed on Oct. 2, 2020, in the Great Britain Intellectual Property Office, and of a Great Britain patent application number 2113942.3, filed on Sep. 29, 2021, in the Great Britain Intellectual Property Office, the disclosure of each of which is incorporated by reference herein in its entirety.

BACKGROUND

1. Field

The disclosure relates to proximity services (ProSe) within a $5^{th}$ Generation (5G) telecommunication network. More particularly, the disclosure relates to providing methods and apparatuses for supporting a plurality of protocol data unit (PDU) sessions.

2. Description of Related Art

To meet an increasing demand for wireless data traffic since deployment of $4^{th}$-Generation (4G) communication systems, efforts have been made to develop an improved $5^{th}$-Generation (5G) or pre-5G communication system. Therefore, the 5G or pre-5G communication system is also called a 'Beyond 4G Network' or a 'post long-term evolution (LTE) System'. The 5G communication system is considered to be implemented in higher frequency (millimeter (mm) Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for supporting a plurality of protocol data unit (PDU) sessions.

Additional aspects will be set forth in part in the description which follows and, in part, will be apparent from the description, or may be learned by practice of the presented embodiments.

In accordance with an aspect of the disclosure, a method of managing a telecommunication network, wherein a first user equipment (UE) is in communication with a core network of the telecommunication network, wherein the first UE establishes a PDU session with the core network and wherein capability information related to an ability of the first UE and/or the telecommunication network to support a plurality of PDU sessions is transmitted in at least one direction between the first UE and the core network is provided.

In an embodiment the method of managing is a method of managing a proximity services, ProSe, connection.

In an embodiment of the disclosure, first capability information is transmitted from the first UE to the core network and second capability information is transmitted from the core network to the first UE.

In an embodiment of the disclosure, the first UE is in communication with a core network of the telecommunication network, wherein a second UE establishes a PDU session with the core network and wherein capability information related to an ability of the second UE and/or the telecommunication network to support a plurality of PDU sessions is transmitted in at least one direction between the second UE and the core network.

In an embodiment of the disclosure, the second UE is a remote UE.

In an embodiment of the disclosure, the second UE performs the exchange of capability information with the network after establishing a ProSe communication (e.g., using PC5 link) with the first UE via which the second UE communicates with the network.

In an embodiment of the disclosure, the first UE is one of a relay UE, a Layer-2 UE to network relay UE and a Layer-3 UE-to-network relay UE.

In an embodiment of the disclosure, the plurality of PDU sessions exceeds sixteen.

In an embodiment of the disclosure, the plurality of PDUs are of the type "unstructured".

In an embodiment of the disclosure, the first or second capability information comprises either information that additional PDUs are supported or a specific number of PDUs that are supported.

In an embodiment of the disclosure, the first or second capability information comprises bits within a message having another function or the first or second capability information is associated with its own respective Information Element.

In an embodiment of the disclosure, in the telecommunication network, an access and mobility management function (AMF) selection of a session management function (SMF) is dependent upon the SMF's ability to use extended PDU Session ID values.

In an embodiment of the disclosure, the first UE establishes a ProSe connection to a second UE, utilizing one of the plurality of PDU sessions, or the second UE establishes a ProSe connection to a first UE, utilizing one of the plurality of PDU sessions.

In accordance with another aspect of the disclosure, a UE, operable to communicate with a telecommunication network and to establish a PDU session with a core network of the telecommunication network, wherein the UE is further operable to transmit capability information related to an ability of the UE to support a plurality of PDU sessions or to receive capability information related to an ability of the telecommunication network to support a plurality of PDU sessions is provided.

In accordance with another aspect of the disclosure, a telecommunication network operable to communicate with a UE and to establish a PDU session with the UE, wherein the telecommunication network is further operable to transmit capability information related to an ability of the telecommunication network to support a plurality of PDU sessions or to receive capability information related to an ability of the UE to support a plurality of PDU sessions is provided.

In an embodiment of the disclosure, the telecommunication network comprises a core network and a radio access network (RAN) and communication with the UE is performed via the RAN.

In accordance with another aspect of the disclosure, a system comprising the telecommunication network of the third aspect and the UE of the second aspect is provided.

In an embodiment of the disclosure, the UE and the network exchange newly defined capability information to indicate whether increased number of PDU session (ID) can be supported.

In an embodiment of the disclosure, the capability information may be in the form of new bits or explicit numbers indicating the maximum number of PDU session (ID) that can be supported by the UE and the network. In an embodiment, the AMF's selection of an SMF takes into account the ability of an SMF to handle or use extended PDU session ID values.

In an embodiment of the disclosure, the capability information about the support of more than 15 PDU session identity may also be performed on the RRC layer i.e., using RRC messages. The RRC messages may be existing (i.e., known in the art) or new messages, defined to implement the disclosure. The UE may autonomously indicate its capability to support more than 15 PDU session identity using any RRC message, and possibly also indicate the actual number of PDU session (identity) that can be supported using any of the mechanisms described earlier. Similarly, the RAN may use an RRC message to indicate whether or not. and possibly the actual number of PDU session (identity). that the RAN supports using any of the mechanisms described earlier.

In an embodiment of the disclosure, the RAN provides the UE's capability to support more than 15 PDU session (identity) and possibly provides the actual number that the UE supports based on a capability that the RAN had received optionally from the UE optionally using any RRC message.

In an embodiment of the disclosure, when the AMF determines to report the capability of the network to support more than 15 PDU session (identity) to the UE (as described earlier), the AMF takes into account the ability for the RAN and optionally the SMF(s) to support more than 15 PDU session (identity). For example, if the RAN does not support more than 15 PDU session identity, then the AMF indicates that the network does not support more than 15 PDU session identity. For example, when processing the establishment of a PDU session with an identity that is larger than 15, the AMF may allow or reject the establishment based on the support of the RAN and optionally also the SMF of a PDU session identity that is larger than 15.

In an embodiment of the disclosure, the RAN may broadcast whether the network supports more than 15 PDU session identity and may also broadcast the actual number that is supported.

In an embodiment of the disclosure, the RRC layer in the UE may indicate to the NAS layer whether the network supports more than 15 PDU session identity and may also indicate the actual number that is supported in the network. The RRC layer may get this information using either broadcast method (e.g., based on broadcast information by the RAN) or using dedicated RRC signaling where for example this signaling is received from the RAN.

In an embodiment of the disclosure, the NAS layer (e.g., the 5GSM entity and/or the 5GMM entity, where the latter may also provide this information to the former as described next) may determine whether or not the network supports more than 15 PDU session (identity) and optionally the actual number that is supported based on information that is received from the network using NAS signaling (as described earlier) or that is received from the RRC layer in the UE.

In an embodiment of the disclosure, when the UE moves into an area, e.g., a new RAN coverage or an area in which there is a different SMF, such that the number of PDU sessions that can be supported by the network changes (e.g., increases to more than 15, or decreases to 15 or less), then the network (e.g., AMF, SMF, RAN) may inform the UE about the actual number of PDU session identity that can be supported in this area.

In an embodiment of the disclosure, the number of PDU session ID that is supported in the network may be expected to be in all of the PLMN's serving area, or may be valid/dependent only in the UE's current registration area, which may also include equivalent PLMNs. Based on any of these, the UE may determine whether the supported number is per the entire PLMN or per a registration area. It may be the case that by default, a certain number of PDU session identity is assumed to be supported until the network indicates otherwise. This default number may be at most 15 or more than 15 or any other number.

Note that the information as described above can apply to any UE and not just a (layer 2 or layer 3) relay UE.

In an embodiment of the disclosure, the UE's PC5 discovery messages are adapted (from known related art messages) to indicate whether extended PDU session (ID) are required/supported. Selection of such UEs will consider this information.

In accordance with another aspect of the disclosure, a method performed by a UE is provided. The method of the UE includes transmitting, toward an AMF entity, a registration request message including first information indicating whether the UE supports an increased number of PDU sessions, receiving, from the AMF entity, a registration accept message including second information indicating whether a network supports the increased number of PDU sessions, and identifying whether the increased number of PDU sessions is allowed to be used based on at least one of the first information or the second information.

In accordance with another aspect of the disclosure, a method performed by an AMF entity is provided. The method of the AMF entity includes receiving, from a UE, a registration request message including first information indicating whether the UE supports an increased number of PDU sessions, and transmitting, to the UE, a registration accept message including second information indicating whether a network supports the increased number of PDU sessions, wherein whether the increased number of PDU sessions is allowed to be used is based on at least one of the first information or the second information.

In accordance with another aspect of the disclosure, a UE is provided. The UE includes a transceiver, and at least one processor configured to transmit, toward an AMF entity via the transceiver, a registration request message including first information indicating whether the UE supports an increased number of PDU sessions, receive, from the AMF entity via the transceiver, a registration accept message including second information indicating whether a network supports the increased number of PDU sessions, and identify whether the increased number of PDU sessions is allowed to be used based on at least one of the first information or the second information.

In accordance with another aspect of the disclosure, an AMF entity is provided. The AMF entity includes a transceiver, and a controller configured to receive, from a UE via the transceiver, a registration request message including first information indicating whether the UE supports an increased number of PDU sessions, and transmit, to the UE via the transceiver, a registration accept message including second information indicating whether a network supports the increased number of PDU sessions, wherein whether the increased number of PDU sessions is allowed to be used is based on at least one of the first information or the second information.

Embodiments of the disclosure extend the number of PDU session ID that can be supported by a UE and enables the UE and network to exchange capability information by this means. This, in turn, enables a relay UE to support a higher number of remote UEs, especially when the number of remote UEs that require PDU sessions of Unstructured data is large (and above 15).

Embodiments of the disclosure enable the network to support more sessions and, hence, more remote UEs. This is advantageous for an application service provider, which can then service more customers for its services. The required changes in the UE and the network are made to increase the number of remote UEs that can be served, especially for Unstructured data sessions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates protocol data unit (PDU) session identity coding according to an embodiment of the disclosure;

FIG. 4 illustrates uplink data status coding according to an embodiment of the disclosure;

FIG. 5 illustrates allowed PDU Session Status coding according to an embodiment of the disclosure;

FIG. 6 illustrates PDU Session Status coding according to an embodiment of the disclosure;

Throughout the drawings, like reference numerals will be understood to refer to like parts, components, and structures.

DETAILED DESCRIPTION

Figure 1:
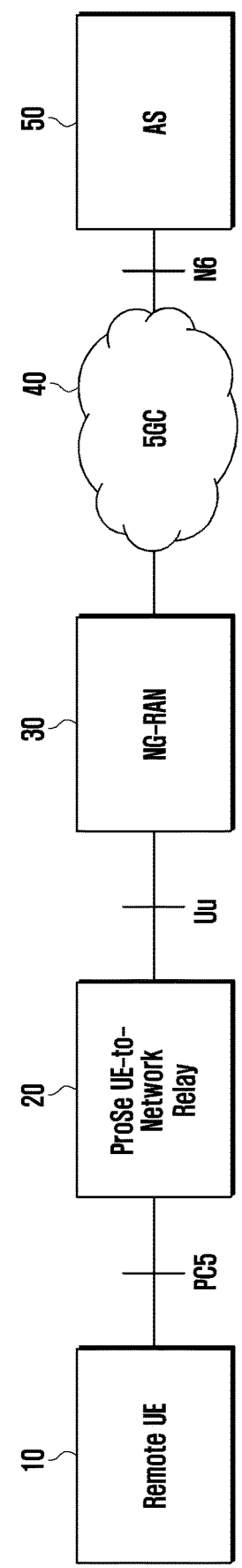
FIG. 1 illustrates a proximity services (ProSe) configuration according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure, a detailed description of relevant known functions or configurations incorporated herein will be omitted when it may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In describing the disclosure below, a detailed description of relevant known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

Note that in the following description the embodiments of the disclosure are not limited to relay UEs only and hence the techniques set out can be applied to any UE. Therefore, any reference to a relay UE should be considered to be an example of a UE in general and not only a relay UE. Note, also, that references to Unstructured PDU session types are exemplary only and embodiments of the disclosure can be applied to any other PDU session type.

FIG. 1 illustrates a ProSe configuration according to an embodiment of the disclosure.

Referring to FIG. 1, a remote UE 10 is connected via a PC5 interface to a relay UE or UE to network relay 20. The relay UE 20 is connected via a Uu interface to a next generation radio access network (NG-RAN) 30 which connects to the 5G core (5GC) 40. Ultimately, the 5GC 40 is in communication with an application server (AS) 50 via an N6 interface.

Note that the general hardware configuration shown in FIG. 1 applies equally to embodiments of the disclosure. Certain entities in the configuration are adapted as per embodiments of the disclosure.

The terms relay, UE-to-Network relay, relay UE, layer-2 relay UE or layer-3 relay UE are used interchangeably throughout the disclosure.

Work undertaken in connection with 5G ProSe supports a User Equipment (UE)-to-network relay (hereafter referred to as relay UE) that enables remote UEs to connect to the 5G core network and obtain services. Note that the remote UEs are so termed because they are not in a coverage area of the Radio Access Network (RAN) themselves and, hence, require connection via one or more relay UEs. The one or more relay UEs effectively extend the reach of the RAN.

The relay UE establishes a protocol data unit (PDU) session that is also used by the remote UE, where the procedures and details on how this is enabled depends on the PDU session type in question. For example, when the relay UE establishes a PDU session for IP traffic, several remote UEs may use one of the relay UE's PDU sessions, since a remote UE's traffic may be mapped to, or identified with, a set of packet filters or service data flows (SDFs). There can be 16 packet filters and hence 16 SDFs for each quality of service (QoS) rule. Moreover, there can be 64 different QoS flow identifiers (QFIs) per PDU session. This shows that one QoS rule, of a PDU session, can be associated with several SDFs and, overall, there can be 64 QFIs for each PDU session. In theory, this means that there can be many more than 64 remote UEs that use one PDU session from a relay UE. Note that this is possible by virtue of support of more than one QoS rule for PDU sessions having the type IP or Ethernet.

On the other hand, a PDU session of type "Unstructured" can only support one QoS rule and that is the default QoS rule. Additionally, the set of packet filters of the default QoS rule must be empty. This means that there is no flexibility or means to multiplex traffic from more than one remote UE on to the Unstructured PDU session of the relay UE. Hence, when a PDU session for type "Unstructured" is established by the relay UE, the PDU session can only be used by one remote UE.

The following is stated in the applicable standard definition (TR 23.752 V0.5.0):

"IP type PDU Session and Ethernet type PDU Session can be used to support more than one Remote UEs while Unstructured type PDU Session can be used to support only one Remote UE."

Further, it should be noted that the relay UE that provides the services as described above is considered to be a Layer 3 (L3) relay UE. Section 6.6 of the aforementioned standard definition provides further information on the procedures involved for the operations of an L3 relay UE, where the solution is considered to be one possible solution for a relay UE.

Every PDU session is uniquely identified by a PDU session identity (ID), where the PDU session ID can take a value between 1 and 15. This is illustrated in FIG. 2, which shows the PDU sessions possible, and the bit coding associated with each.

FIG. 2 illustrates PDU session identity coding according to an embodiment of the disclosure.

Referring to FIG. 2, Bits 1 to 8 of the second octet of every 5GSM message contain the PDU session identity Information Element (IE). The PDU session identity and its use to identify a message flow are defined in the applicable standard.

Figure 3:
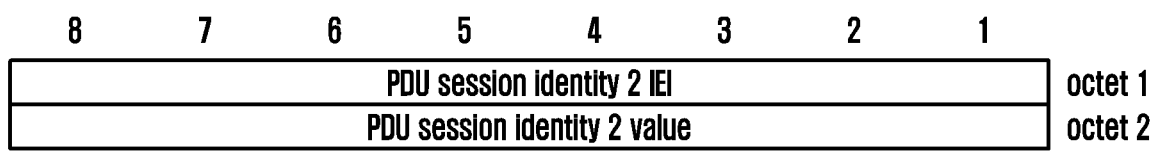
FIG. 3 illustrates PDU session identity 2 coding according to an embodiment of the disclosure.

FIG. 3 illustrates PDU session identity 2 coding according to an embodiment of the disclosure.

Referring to FIG. 3, the purpose of the "PDU session identity 2" information element is to indicate the identity of a PDU session in a 5GMM message.

The "PDU session identity 2" information element is coded as shown in FIG. 3.

The "PDU session identity 2" is a type 3 information element with a length of 2 octets. The coding of the "PDU session identity 2" (octet 2) value is identical to the coding of the PDU session identity value as defined in 3GPP TS 24.007.

The IEs shown in FIGS. 4 to 6 also contain a bitmap where each bit represents a PDU session ID.

FIG. 4 illustrates uplink data status coding according to an embodiment of the disclosure.

The purpose of the Uplink data status IE is to indicate to the network which preserved PDU sessions have uplink data pending.

Referring to FIG. 4, the Uplink data status information element is a type 4 information element with minimum length of 4 octets a maximum length of 34 octets.

PSI(x) shall be coded as follows.
PSI(0): Bit 1 of octet 3 is spare and shall be coded as zero.
PSI(1)-PSI(15):
0 indicates that no uplink data are pending for the corresponding PDU session identity or the PDU session is in PDU SESSION INACTIVE state or is in PDU SESSION ACTIVE state with user-plane resources already established.

1 indicates that uplink data are pending for the corresponding PDU session identity and the user-plane resources for the corresponding PDU session are not established.

All bits in octet 5 to 34 are spare and shall be coded as zero, if the respective octet is included in the information element.

FIG. 5 illustrates allowed PDU session status coding according to an embodiment of the disclosure.

The purpose of the Allowed PDU session status IE is to indicate to the network user-plane resources of PDU sessions associated with non-3GPP access that are allowed to be re-established over 3GPP access or if there is no PDU session(s) for which the UE allows the user-plane resources to be re-established over 3GPP access.

Referring to FIG. 5, the Allowed PDU session status is a type 4 information element with minimum length of 4 octets and maximum length of 34 octets.

PSI(x) shall be coded as follows.
PSI(0):
Bit 1 octet 3 is spare and shall be coded as zero.
PSI(1)-PSI(15):
0 indicates that the user-plane resources of corresponding PDU session is not allowed to be re-established over 3GPP access.
1 indicates that the user-plane resources of corresponding PDU session can be re-established over 3GPP access.
If there is no PDU session for which the user-plane resources can be re-established over 3GPP access, all bits in PSI(1)-PSI(15) shall be coded as zero.
All bits in octet 5 to 34 are spare and shall be coded as zero, if the respective octet is included in the information element.

FIG. 6 illustrates PDU session status coding according to an embodiment of the disclosure.

The purpose of the PDU session status IE is to indicate the state of each PDU session that can be identified by a PDU session identity.

Referring to FIG. 6, the PDU session status information element is a type 4 information element with minimum length of 4 octets and a maximum length of 34 octets.

PSI(x) shall be coded as follows.
PSI(0): Bit 1 of octet 3 is spare and shall be coded as zero.
PSI(1)-PSI(15):
0 indicates that the 5GSM state of the corresponding PDU session is PDU SESSION INACTIVE.
1 indicates that the 5GSM state of the corresponding PDU session is not PDU SESSION INACTIVE.
All bits in octet 5 to 34 are spare and shall be coded as zero, if the respective octet is included in the information element.

Based on the analysis above, it is clear that the maximum number of PDU sessions that can be supported by any UE is 15.

In the related art, the maximum number of PDU session IDs limits the number of PDU sessions, and hence remote UEs, that can be served by a relay UE. This is especially the case when all or most of the remote UEs are using Unstructured PDU session types, as referenced previously. This allows only a single remote UE to be supported by the relay UE.

An extended number of PDU sessions is desirable for UE-to-Network Relay, in particular for Unstructured type PDU Session.

In the related art, if there are more than 16 remote UEs that need to obtain services via the same relay UE, then only 15 UEs will be able to connect via the relay UE, if all remote UEs require to use a PDU session having Unstructured data type.

It is an aim of embodiments of the disclosure to address this and other shortcomings.

In order to address the problems in the related art, a relay UE should support more than 15 PDU sessions in order to serve more than 15 remote UEs. However, supporting more than 15 PDU sessions requires the following changes to related art systems:

The UE and the network (e.g., an access and mobility management function, AMF or the RAN) exchange their capabilities with respect to the number of PDU sessions that can be supported.

The relevant information elements, IE, are extended such that new values for the PDU session ID beyond the related art value of 15 can be defined and used.

Embodiments of the disclosure provide that the UE and the network should, in general, exchange new capabilities to indicate whether or not they support more than 15 PDU sessions, hereafter referred to as increased number of PDU sessions (when compared to the related art).

There are a number of ways to achieve this aim and the following description sets these out.

In an embodiment of the disclosure, the UE uses a new bit in the 5G mobility management (5GMM) capability IE to indicate if it supports an increased number of PDU sessions. For example, a new "Support for increased number of PDU sessions" bit is defined, where the value "1" is used to indicate "Increased number of PDU sessions supported" and the value "0" is used to indicate "Increased number of PDU sessions not supported".

Similarly, the AMF (e.g., in addition to/or another network entity, e.g., RAN) indicates if an increased number of PDU sessions is supported in the network or PLMN. A new bit, e.g., in the 5GS network feature support IE can be used to indicate this. For example, a new "Support for increased number of PDU sessions" bit is defined, where the value "1" is used to indicate "Increased number of PDU sessions supported" and the value "0" is used to indicate "Increased number of PDU sessions not supported". Other IEs and/or fields may be also used, e.g., when the exchange of capabilities happen using RRC signaling.

Note that the support of increased number of PDU session may be used to indicate that a fixed number of PDU sessions is supported, where this number can be any integer N that is pre-determined. For example, with N=64, the use of the bits as set out above would implicitly mean that the UE or the network supports 64 PDU sessions. It should be noted that the value N=64 is an example only, and other pre-determined values can also be defined for this purpose.

Although not explicitly stated, it is understood that the 5GMM capability IE is sent by the UE in the Registration Request message, and the 5GS network feature support IE is sent by the AMF in the Registration Accept message.

Optionally, and perhaps in addition to the details of the embodiment above, the UE and the network (e.g., AMF, RAN, or the like) can explicitly indicate the maximum number of PDU sessions that can be supported. To do so, a new IE is defined for this purpose. For example, a new Number of supported PDU sessions IE is defined and is sent by the UE to indicate an integer number that represents the total number of PDU sessions that the UE can support. Note that this IE may also be used to indicate the additional number of PDU sessions that the UE can support on top of 15 PDU sessions that is assumed to be supported by the UE. The UE sends this IE in the Registration Request message where, optionally, the message is not being sent due to periodic update (i.e., this IE should not be sent when the 5GS registration type IE indicates "periodic registration updating") and so the IE is sent for all other values indicated by the 5GS registration type IE except "periodic registration updating".

The AMF receives the new IE indicating the total number of PDU sessions that is supported by the UE, or the additional number of PDU sessions that is supported by the UE (i.e., in addition to an assumed 15 PDU sessions). The AMF receives this IE in the Registration Request message. The AMF then determines the maximum number of PDU sessions that can be used by the UE as follows:

If the total number of PDU sessions that the network (e.g., AMF and/or RAN, or the like) supports is less than the total number that the UE indicates, then the AMF determines the maximum number of PDU sessions for this UE to be the total number of PDU sessions that the AMF (and/or RAN, or the like) supports.

If the total number of PDU sessions that the network (e.g., AMF and/or RAN, or the like) supports is more than the total number that the UE indicates, then the AMF determines the maximum number of PDU sessions for this UE to be the total number of PDU sessions that the UE supports.

Note: the above means that the total number of PDU sessions that can be used by the UE is equal to min{maximum number of PDU sessions supported by the AMF (and/or RAN, or the like), maximum number of PDU sessions that is supported by the UE} or is equal min{maximum number of PDU sessions supported by the AMF, maximum number of PDU sessions supported by the SMF, maximum number of PDU sessions supported by the RAN, maximum number of PDU sessions that is supported by the UE}. It should be noted that the formula provided above is an example and the actual formula may consist of fewer elements and/or combinations.

When the AMF determines the maximum number of PDU sessions that can be used by the UE in question, the AMF sends a new IE in the Registration Accept message to indicate the maximum number of PDU sessions that can be used by the UE. The indicated number is based on the determined number as explained above. The AMF may use new IE which can be called, e.g., Number of supported PDU sessions IE or Number of allowed PDU sessions IE. This IE indicates an integer number that represents the total number of PDU sessions that the UE can use or that is allowed for use by the UE, as explained above. The AMF may also inform the RAN about the support of more than 15 PDU session identity for the UE in question and may also indicate the actual number that is supported. The AMF may do so using any message that is used on the protocol between the AMF and the RAN (e.g., on the N2 interface). Any existing or new IE/field may be used to do so.

When the UE receives an indication from the network that an increased number of PDU sessions is supported or allowed for the UE, the UE determines that an increased number of PDU sessions can be used in this network and optionally determines the number that is supported or allowed in the network using any of the following options, in any combination:

The UE may determine the total number of PDU sessions that is supported or allowed based on a pre-determined value. For instance, the pre-determined value can be an integer N of supported number of PDU sessions.

The UE may determine the total number of PDU sessions that is supported or allowed based on a value that is received in a new IE in the Registration Accept message. This value may represent a total number of PDU sessions that is allowed or supported for the UE, or an additional value on top of 15 PDU sessions that is assumed to be supported by the network and hence the total number is determined to be 15 plus the additional value that is indicated to the UE by means of a new IE in the Registration Accept message.

The UE may determine the total number of PDU sessions that is supported or allowed based on a value that is received in from the RRC layer, where the RRC layer provides this indication to the NAS, e.g., based on an RRC message that is received from the RAN, where the message may be a broadcast message or a dedicated message (or RRC signaling message).

Note that the indication referred to above can be a new bit (e.g., in the 5GS network feature support IE) and/or a new IE in the Registration Accept message and/or a new bit or information in an RRC message or a 5GSM message.

The new IE that is set out above, either to be sent by the UE or by the network, or both, can be of the form TV (Type and Value) or TLV (Type, Length, and Value).

When the UE determines that an increased number of PDU sessions can be supported, or is allowed for the UE in this network or PLMN, the UE may use a PDU session ID whose value can be more than 15 up to the maximum number of PDU sessions that the UE has determined to be supported, or is allowed in the network, as explained above.

To support an increased number of PDU sessions as set out above, certain related art IEs need to be updated to enable this increase. For example, the PDU session identity IE needs to be updated such that new values are defined and used by either the UE or the network. The new values can be defined accordingly to, e.g., start from the value 16 up to the maximum number of PDU sessions that has been determined to be allowed or supported for the UE in the network.

Similarly, the Uplink data status IE, Allowed PDU session status IE, and the PDU session status IE need to be updated accordingly. For example, more octets and bit positions may be used and defined to represent the new PDU session ID values. As such, these IEs are adapted to have their reserved fields updated to now represent the new PDU session ID where more octets can be defined depending on the maximum number of PDU sessions that are allowed or supported for the UE. Note that other identities, e.g., a bearer ID that may be used in the RRC layer, can also be updated accordingly.

When an increased number of PDU sessions is supported by both the UE and the network, then both the UE and the network use the updated IEs to match the maximum number of PDU sessions that are supported or allowed for the UE.

For example, if the UE and/or the network determine that the maximum number of PDU sessions that can be used for the UE is 31, then the PDU session identity IE (or any other IE that is of the same type, e.g., PDU session identity 2, or the like) can have values that are extended, where the extension starts with the value 16 up until 31. Similarly, all the other IEs, e.g., PDU session status IE, or the like, that have a bitmap representing PDU session IDs can in turn be extended to enable a bitmap that represents the value 16 to 31.

In one example, the PDU session status IE can now use two additional octets (e.g., octets 5 and 6) with new bit positions, where each bit represents the extended values, i.e., 16 to 31 in this example. Note that this is just an example and should not be considered to be limiting. Hence the same solution would apply if the extended value is different from 31 (i.e., either less than or greater than 31) and the extended values and bitmaps of the necessary IEs can also be modified accordingly.

Note that extension of the PDU session ID implies that the AS also supports more data radio bearers, and there should be a one to one mapping between the PDU session ID and a DRB ID. As such, the DRB identities should also be updated accordingly.

Note that the AS layer in the UE may also inform the RAN about the support of increased number of PDU session. This can be done using any form of an indication at the AS layer, e.g., a new bit or new IE in any RRC message or, optionally, any IE that contains capability information of the UE. The indication may also provide the exact number of PDU sessions that can be supported for the UE.

Optionally, the AMF may inform the (R)AN about the use of increased number of PDU session for the UE. This indication may be sent in any message over the N2 interface (i.e., interface between the (R)AN and the AMF. The indication may be in the form of a bit or an IE and may also provide the exact number of PDU sessions that can be supported for the UE.

The following describes other actions taken by the network when an increased number of PDU session ID is used as set out herein.

When a UE (e.g., a relay UE) requests to establish a new PDU session for which the PDU session ID represents a value that is above 15, i.e., the value used by the UE is one of the extended or new values for the PDU session ID, the selection of an SMF by the AMF should consider the support of extended or increased PDU session ID by the SMF. Thus, the AMF should select an SMF that is capable of supporting and handling a PDU session ID for which the value is increased beyond 15. The AMF's selection policy, i.e., the policy used to select an SMF, should now consider the support of increased number of PDU session ID and therefore the AMF should select an SMF that supports increased number of PDU sessions.

Upon reception of an UL NAS TRANSPORT message with a 5GSM message and for which the request type indicates "initial request", the AMF should consider the PDU session ID value when selecting an SMF as described above. If an SMF that supports an increased number of PDU session ID cannot be selected, the AMF should send a DL NAS TRANSPORT message and include the 5GSM message that could not be forwarded to any SMF. The AMF should also include a new or existing 5GMM cause code to indicate a reason why the 5GSM message cannot be forwarded. For example, a new 5GMM code value set to "SMF supporting increased PDU session ID not found" may be used. However, this is just an example and other values, even existing related art values, can be used instead.

It may also be possible (and hence is described as an embodiment) that the use of a set of slices requires the support of a PDU session identity that is greater than 15. Alternatively, the slices that may be allowed for a UE may be such that they support a PDU session identity that is more than 15. This set of slices may be determined from the subscription and/or local AMF policy. Any such slice that is provided to the UE, e.g., by the AMF, may also include an indication that the slice is associated with a PDU session identity that is greater than 15, or that can be used with an identity that is greater than 15.

The following describes other actions taken by a UE when an increased number of PDU session ID is used as set out herein:

A UE (e.g., a relay UE or a discoveree UE should indicate in the PC5 discovery message(s) whether it supports:

- extended number of PDU sessions (i.e., support for increased number of PDU sessions), or
- the UE may indicate the maximum number of PDU sessions where this number may represent the number of PDU sessions that can be supported in total, or that are still available or vacant and may optionally refer to the number of new remote UEs that can be served/accommodated/accepted optionally for a particular PDU session type, e.g., Unstructured PDU session type or
- the UE may implicitly indicate whether there are still available or vacant PDU sessions via Service and application information that is enabled or authorized to be relayed.

This can be indicated in the PC5 discovery message that is either sent for Model A or Model B PC5 discovery procedures. The relay UE may optionally indicate how many more PDU sessions it can support for a particular PDU session type, e.g., Unstructured session type. The UE may also indicate if it can accept more remote UEs, optionally, where this indication may be per PDU session type. For example, if the UE in question is a relay UE and the number of supported PDU sessions (regardless of this number being extended or not) has not been exhausted yet, the UE may indicate that it can accommodate new remote UEs optionally for a particular PDU session type, e.g., unstructured PDU session type. When the UE reaches its maximum number of PDU sessions i.e., no new PDU session can be further established (e.g., due to the PDU session ID reaching the maximum value that can be supported), the UE may stop indicating that it can accommodate new UEs, e.g., remote UEs, optionally for a particular PDU session type, e.g., Unstructured PDU session type. If a PDU session (ID) becomes vacant in the relay UE, then the relay UE may again start sending an indication that it can support new remote UE(s) optionally for a particular PDU session type, e.g., unstructured PDU session type. Note that the above indications can be included in PC5 discovery messages for Model A or Model B PC5 discovery procedures. Note that the above behavior may be performed for Model A PC5 discovery or for Model B PC5 discovery where, for the latter, the UE may take the actions above optionally after receiving a request (e.g., solicitation via a, e.g., PC5 discovery message) from another UE to discover a particular relay UE with certain capabilities as explained below.

Note that the relay UE may receive more than one PC5 discovery message for Model B i.e., a solicitation discovery message, where the sending UE requests the discovery of a UE, e.g., a relay UE, with certain capabilities, such as the ability to provide service or accommodate a new UE (e.g., a remote UE) optionally for a particular PDU session type, e.g., unstructured PDU session type. The UE may prioritize its response to the sending UEs based on any of the following:

- Based on the time that the discovery message was received. Hence, the relay UE will first respond to the UE from which the discovery message (i.e., solicitation message) was first received.
- Based on the slice (S-NSSAI) that is being discovered, where the relay UE may be, e.g., configured with a list of S-NSSAIs each of which has an associated priority. Hence the relay UE may first respond to the UE that requests a particular S-NSSAI if that S-NSSAI is considered to be of higher priority than another S-NS- SAI that may have been requested by another UE. This may be done regardless of the time that the discovery message was received.

Based on the Data Network Name (DNN) that is being discovered, where the relay UE may be, e.g., configured with a list of DNNs each of which has an associated priority. Hence the relay UE may first respond to the UE that requests a particular DNN if that DNN is considered to be of higher priority than another DNN that may have been requested by another UE. This may be done regardless of the time that the discovery message was received.

Based on the ProSe discovery code (e.g., a relay service code), or group ID, that is being discovered, where the relay UE may be, e.g., configured with a list of ProSe discovery code (e.g., a relay service code), or group ID, each of which has an associated priority. Hence the relay UE may first respond to the UE that requests a particular ProSe discovery code (e.g., a relay service code), or group ID, if that ProSe discovery code (e.g., a relay service code), or a group ID, is considered to be of higher priority than another DNN that may have been requested by another UE. This may be done regardless of the time that the discovery message was received.

Any combination of the above

Note that for any of the above, if the priority of the parameter in question is the same, i.e., as requested from more than one UE, the relay UE may choose a UE to respond to first based on implementation, e.g., using a random selection.

A UE (e.g., a remote UE or discoverer UE) may participate in a Model B discovery over the PC5 interface where the UE can request the discovery of UEs (e.g., relay UEs) that support:
  extended or increased number of PDU sessions or PDU session IDs, or
  where the solicitation message (i.e., a discovery message) requests the discoveree UE (e.g., a relay UE) to indicate the maximum number of PDU sessions that are supported. Note that this number may represent the number of PDU sessions that can be supported in total, or that are still available or vacant and may optionally refer to the number of new remote UEs that can be served/accommodated/accepted optionally for a particular PDU session type, e.g., unstructured PDU session type.

The UE may send a PC5 discovery message for Model B discovery in which it indicates that the UE wants to discover (or solicits the discovery of) another UE (e.g., a UE-to-Network relay) which supports increased number of PDU sessions, optionally for Unstructured PDU session type. Alternatively, the UE may send a PC5 discovery message for Model B discovery in which it indicates that the UE wants to discover (or solicits the discovery of) another UE (e.g., a UE-to-Network relay) which can accommodate a new UE (e.g., a remote UE) optionally for a particular PDU session type, e.g., unstructured PDU session type.

A UE may receive a PC5 discovery message from another UE (e.g., a relay UE) indicating that the sending UE supports:
  extended or increased number of PDU session (ID), optionally for Unstructured PDU session type, or
  can accept/serve/accommodate more remote UEs, optionally where this indication may be per PDU session type, e.g., unstructured PDU session type, or
  the maximum number of PDU sessions that are supported. Note that this number may represent the number of PDU sessions that can be supported in total, or that are still available or vacant and may optionally refer to the number of new remote UEs that can be served/accommodated/accepted optionally for a particular PDU session type, e.g., unstructured PDU session type.

The UE may also receive another similar message from another sender where the discovery message contains similar information as listed above, e.g., the discovery message may indicate that the other sending UE does not support extended or increased PDU session (ID). The discoverer UE (e.g., a remote UE) may select the target UE (e.g., a UE-to-Network relay UE) which:
  supports an extended or increased PDU session (ID) over the other UE which does not, or
  can accommodate/serve/accept more remote UEs, optionally where this indication may be per PDU session type, e.g., unstructured PDU session type, or
  has a larger maximum number of PDU sessions that are/can be supported.

This may be done optionally if the discoverer UE requires a PDU session for Unstructured data type.

Note that all of the above can also apply to a remote UE, where optionally the remote UE communicates with the network using a (layer-2 or layer-3) UE-to-network relay UE.

All of the above herein may apply in any combination or order.

Moreover, the detailed description herein can apply to any UE in Si mode (i.e., in EPS/EPC) where the relevant NAS messages (which may be different but considered to be equivalent) can be used accordingly with the appropriate IEs or fields, or the like. As such, the network nodes used herein may also be network nodes in EPS/EPC and the proposals would apply in a similar manner for a UE and/or network in Si mode.

Figure 7:
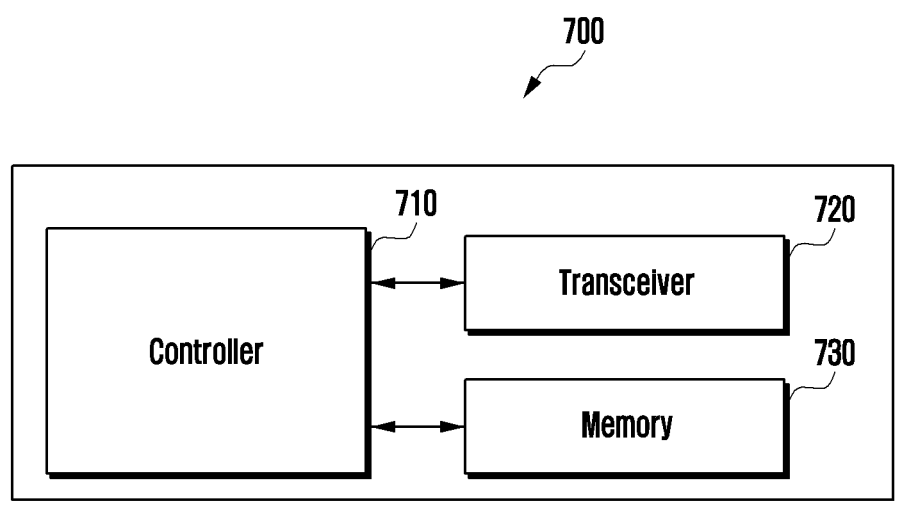
FIG. 7 illustrates a structure of a user equipment (UE) according to an embodiment of the disclosure.

FIG. 7 illustrates a structure of a user equipment (UE) according to an embodiment of the disclosure.

Referring to FIG. 7, a UE 700 may include a controller 710, a transceiver 720 and a memory 730. However, all of the illustrated components are not essential. The UE 700 may be implemented by more or less components than those illustrated in FIG. 7. In addition, the controller 710 and the transceiver 720 and the memory 730 may be implemented as a single chip according to another embodiment.

The UE 700 may correspond to a UE described above.

The aforementioned components will now be described.

The controller 710 may include one or more processors or other processing devices that control the proposed function, process, and/or method. Operation of the UE 700 may be implemented by the controller 710.

The transceiver 720 may include a RF transmitter for up-converting and amplifying a transmitted signal, and a RF receiver for down-converting a frequency of a received signal. However, according to another embodiment of the disclosure, the transceiver 720 may be implemented by more or less components than those illustrated in components.

The transceiver 720 may be connected to the controller 710 and transmit and/or receive a signal. The signal may include control information and data. In addition, the transceiver 720 may receive the signal through a wireless channel and output the signal to the controller 710. The transceiver 720 may transmit a signal output from the controller 710 through the wireless channel.

The memory 730 may store the control information or the data included in a signal obtained by the UE 700. The memory 730 may be connected to the controller 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

Figure 8:
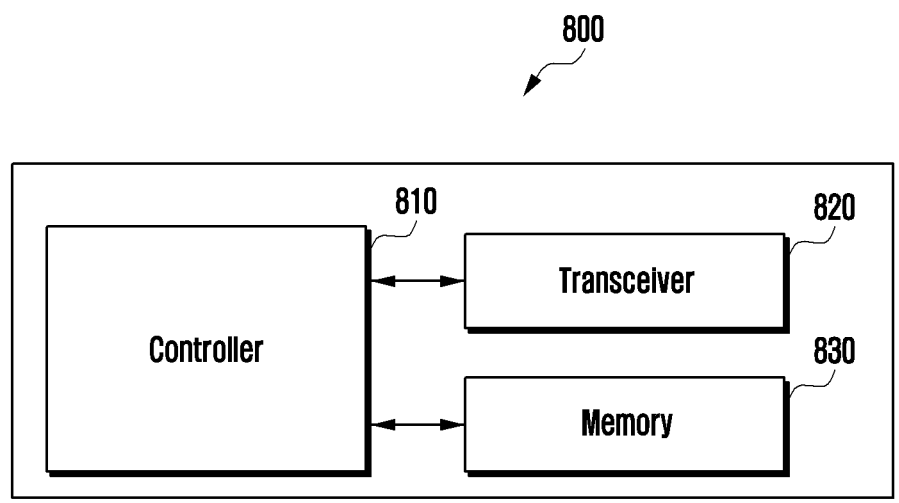
FIG. 8 illustrates a structure of a base station according to an embodiment of the disclosure.

FIG. 8 illustrates a structure of a base station according to an embodiment of the disclosure.

In the disclosure, a base station may be the entity that allocates resources to a UE, and may be one of an eNode B, a gNode B, Node B, a base station (BS), a radio access network (RAN), an access network (AN).

Referring to FIG. 8, a base station 800 may include a controller 810, a transceiver 820 and a memory 830. However, all of the illustrated components are not essential. The base station 800 may be implemented by more or less components than those illustrated in FIG. 8. In addition, the controller 810 and the transceiver 820 and the memory 830 may be implemented as a single chip according to another embodiment.

The base station 800 may correspond to a base station described above.

The aforementioned components will now be described.

The controller 810 may include one or more processors or other processing devices that control the proposed function, process, and/or method. Operation of the base station 800 may be implemented by the controller 810.

The transceiver 820 may include a RF transmitter for up-converting and amplifying a transmitted signal, and a RF receiver for down-converting a frequency of a received signal. However, according to another embodiment of the disclosure, the transceiver 820 may be implemented by more or less components than those illustrated in components.

The transceiver 820 may be connected to the controller 810 and transmit and/or receive a signal. The signal may include control information and data. In addition, the transceiver 820 may receive the signal through a wireless channel and output the signal to the controller 810. The transceiver 820 may transmit a signal output from the controller 810 through the wireless channel.

The memory 830 may store the control information or the data included in a signal obtained by the base station 800. The memory 830 may be connected to the controller 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

Figure 9:
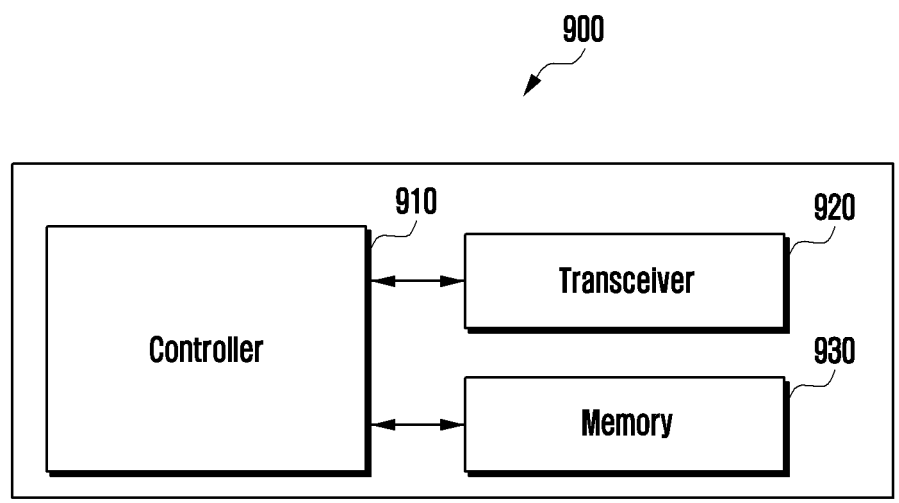
FIG. 9 illustrates a structure of a network entity according to an embodiment of the disclosure.

FIG. 9 illustrates a structure of a network entity according to an embodiment of the disclosure.

In the disclosure, a network entity may be the entity performing network functions (e.g, access and mobility management function (AMF), session management function (SMF), and the like). In the disclosure, for convenience, an entity performing an AMF may be expressed as AMF or AMF entity. Further, in the disclosure, for convenience, an entity performing a SMF may be expressed as SMF or SMF entity. In addition, for convenience, an entity performing a function may be abbreviated and described as the name of the function.

Referring to FIG. 9, a network entity 900 may include a controller 910, a transceiver 920 and a memory 930. However, all of the illustrated components are not essential. The network entity 900 may be implemented by more or less components than those illustrated in FIG. 9. In addition, the controller 910 and the transceiver 920 and the memory 930 may be implemented as a single chip according to another embodiment.

The network entity 900 may correspond to an AMF or a SMF described above.

The aforementioned components will now be described.

The controller 910 may include one or more processors or other processing devices that control the proposed function, process, and/or method. Operation of the network entity 900 may be implemented by the controller 910.

The transceiver 920 may be connected to the controller 910 and transmit and/or receive a signal to/from other entities. The signal may include control information and data.

The memory 930 may store the control information or the data included in a signal obtained by the network entity 900. The memory 930 may be connected to the controller 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms, such as 'component', 'module' or 'unit' used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments of the disclosure, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment of the disclosure, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the operations of any method or process so disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:
   transmitting, to an access and mobility management (AMF) entity, a registration request message including a first bit indicating whether the UE supports an increased number of protocol data unit (PDU) sessions and first information on a first total number of PDU sessions that the UE can support;
   receiving, from the AMF entity, a registration accept message including a second bit indicating whether a network supports the increased number of PDU sessions and second information on a maximum number of PDU sessions;
   identifying whether the increased number of PDU sessions is allowed to be used, based on the second bit; and
   in case that the increased number of PDU sessions is allowed to be used, determining a second total number of PDU sessions which can be supported in the network, based on the second information,
   wherein a session management function (SMF) entity is selected by the AMF entity based on whether the SMF entity supports the increased number of PDU sessions.

2. The method of claim 1,
   wherein the first bit is in capability information for the UE included in the registration request message, and
   wherein the second bit is in support information for the network included in the registration accept message.

3. The method of claim 1, wherein the second total number of PDU sessions which can be supported in the network is based on a predetermined value.

4. The method of claim 1,
   wherein at least one of PDU session identity information element (IE), uplink data status IE, or allowed PDU session status IE is based on the determined second total number of PDU sessions which can be supported in the network, and
   wherein the second total number of PDU sessions is greater than 15.

5. The method of claim 4, further comprising:
   transmitting, to the AMF entity, a request message for establishing a PDU session for a PDU session identity (ID) associated with an extended value according to the increased number of PDU sessions.

6. A method performed by an access and mobility management (AMF) entity in a communication system, the method comprising:
   receiving, from a user equipment (UE), a registration request message including a first bit indicating whether the UE supports an increased number of protocol data unit (PDU) sessions and first information on a first total number of PDU sessions that can be supported by the UE;
   transmitting, to the UE, a registration accept message including a second bit indicating whether a network supports the increased number of PDU sessions and second information on a maximum number of PDU sessions; and
   selecting a session management function (SMF) entity supporting the increased number of PDU sessions,
   wherein whether the increased number of PDU sessions is allowed to be used is based on the second bit, and
   wherein a second total number of PDU sessions which can be supported in the network is determined based on the second information.

7. The method of claim 6,
   wherein the first bit is in capability information for the UE included in the registration request message, and
   wherein the second bit is in support information for the network included in the registration accept message.

8. The method of claim 6, wherein the second total number of PDU sessions which can be supported in the network is based on a predetermined value.

9. The method of claim 6,
   wherein at least one of PDU session identity information element (IE), uplink data status IE, or allowed PDU session status IE is based on the determined second total number of PDU sessions which can be supported in the network, and
   wherein the second total number of PDU session is greater than 15.

10. The method of claim 9, further comprising:
    receiving, from the UE, a request message for establishing a PDU session for a PDU session identity (ID) associated with an extended value according to the increased number of PDU sessions.

11. A user equipment (UE) in a communication system, the UE comprising:
    a transceiver; and
    at least one processor configured to:
       transmit, to an access and mobility management (AMF) entity, a registration request message including a first bit indicating whether the UE supports an increased number of protocol data unit (PDU) sessions and first information on a first total number of PDU sessions that the UE can support,
       receive, from the AMF entity, a registration accept message including a second bit indicating whether a network supports the increased number of PDU sessions and second information on a maximum number of PDU sessions,
       identify whether the increased number of PDU sessions is allowed to be used, based on the second bit, and
       in case that the increased number of PDU sessions is allowed to be used, determine a second total number of PDU sessions which can be supported in the network, based on the second information,
    wherein a session management function (SMF) entity is selected by the AMF entity based on whether the SMF entity supports the increased number of PDU sessions.

12. The UE of claim 11,
    wherein the first bit is in capability information for the UE included in the registration request message, and wherein the second bit is in support information for the network included in the registration accept message.

13. The UE of claim 11, wherein the second total number of PDU sessions which can be supported in the network is based on a predetermined value.

14. The UE of claim 11,
wherein at least one of PDU session identity information element (IE), uplink data status IE, or allowed PDU session status IE is based on the determined second total number of PDU sessions which can be supported in the network, and
wherein the second total number of PDU sessions is greater than 15.

15. The UE of claim 14, wherein the at least one processor is further configured to:
transmit, to the AMF entity via the transceiver, a request message for establishing a PDU session for a PDU session identity (ID) associated with an extended value according to the increased number of PDU sessions.

16. An access and mobility management function (AMF) entity in a communication system, the AMF entity comprising:
a transceiver; and
at least one processor configured to:
receive, from a user equipment (UE), a registration request message including a first bit indicating whether the UE supports an increased number of protocol data unit (PDU) sessions and first information on a first total number of PDU sessions that can be supported by the UE,
transmit, to the UE, a registration accept message including a second bit indicating whether a network supports the increased number of PDU sessions and second information on a maximum number of PDU sessions, and
select a session management function (SMF) entity supporting the increased number of PDU sessions,
wherein whether the increased number of PDU sessions is allowed to be used is based on the second bit, and
wherein a second total number of PDU sessions which can be supported in the network is determined based on the second information.

17. The AMF entity of claim 16,
wherein the first bit is in capability information for the UE included in the registration request message, and
wherein the second bit is in support information for the network included in the registration accept message.

18. The AMF entity of claim 16, wherein the second total number of PDU sessions which can be supported in the network is based on a predetermined value.

19. The AMF entity of claim 16,
wherein at least one of PDU session identity information element (IE), uplink data status IE, or allowed PDU session status IE is based on the determined second total number of PDU sessions which can be supported in the network, and
wherein the second total number of PDU session is greater than 15.

20. The AMF entity of claim 19, wherein the at least one processor is further configured to:
receive, from the UE, a request message for establishing a PDU session for a PDU session identity (ID) associated with an extended value according to the increased number of PDU sessions.

* * * * *